United States Patent [19]
Lowry et al.

[11] Patent Number: 5,975,195
[45] Date of Patent: *Nov. 2, 1999

[54] ROTATABLE HEAT TRANSFER COUPLING

[75] Inventors: David A. Lowry, Wayne; Eugene Novin, Ambler, both of Pa.

[73] Assignee: CEMA Technologies, Inc., Bridgeport, Pa.

[*] Notice: This patent is subject to a terminal disclaimer.

[21] Appl. No.: 09/189,474

[22] Filed: Nov. 10, 1998

Related U.S. Application Data

[63] Continuation of application No. 08/821,942, Mar. 21, 1997, Pat. No. 5,832,987.

[51] Int. Cl.$^6$ .............................. F28D 15/00; H05K 7/20
[52] U.S. Cl. ................. 165/86; 165/104.33; 165/185; 174/15.2; 361/687; 361/700
[58] Field of Search ................... 165/86, 104.33, 165/185; 174/15.2; 361/687, 700

[56] References Cited

U.S. PATENT DOCUMENTS

| | | |
|---|---|---|
| 4,203,488 | 5/1980 | Johnson et al. . |
| 4,215,361 | 7/1980 | McCarthy . |
| 4,235,285 | 11/1980 | Johnson et al. . |
| 4,471,837 | 9/1984 | Larson . |
| 4,508,163 | 4/1985 | McCarthy . |
| 4,544,942 | 10/1985 | McCarthy . |
| 4,552,206 | 11/1985 | Johnson et al. . |
| 4,679,118 | 7/1987 | Johnson et al. . |
| 4,888,313 | 12/1989 | Adams et al. . |
| 4,894,273 | 1/1990 | Lieberman et al. . |
| 4,933,746 | 6/1990 | King . |
| 5,011,725 | 4/1991 | Foster . |
| 5,040,096 | 8/1991 | Churchill et al. . |
| 5,062,891 | 11/1991 | Gruber et al. . |
| 5,261,005 | 11/1993 | Masayuki . |
| 5,285,350 | 2/1994 | Villaume . |
| 5,304,735 | 4/1994 | Earl et al. . |
| 5,383,340 | 1/1995 | Larson et al. . |
| 5,384,940 | 1/1995 | Soule et al. . |
| 5,437,561 | 8/1995 | Earl et al. . |
| 5,458,189 | 10/1995 | Larson et al. . |
| 5,472,043 | 12/1995 | Larson et al. . |
| 5,485,671 | 1/1996 | Larson et al. . |
| 5,491,874 | 2/1996 | Lowry et al. ............................. 16/342 |
| 5,502,582 | 3/1996 | Larson et al. . |
| 5,588,483 | 12/1996 | Ishida ........................................ 165/86 |
| 5,598,320 | 1/1997 | Toedtman et al. ..................... 361/687 |
| 5,621,613 | 4/1997 | Haley et al. ............................. 361/687 |
| 5,646,822 | 7/1997 | Bhatia et al. ........................... 361/687 |
| 5,781,409 | 7/1998 | Mecredy, III .......................... 361/687 |
| 5,832,987 | 11/1998 | Lowry et al. ............................. 165/86 |

*Primary Examiner*—Leonard Leo
*Attorney, Agent, or Firm*—Akin, Gump, Strauss, Hauer & Feld, L.L.P.

[57] ABSTRACT

A rotatable heat transfer coupling for rotatably connecting a first object to a second object for transfer of heat from the first object to the second object is provided. The rotatable heat transfer coupling includes a first heat transfer housing for attachment to one of the first and second objects. The housing has an outside surface and an inside surface defining a generally cylindrical cavity having a longitudinal axis. A slot is provided through the housing between the surface and the generally cylindrical cavity. A cylindrical heat transfer component which is connected to the other of the first and second objects is located within the generally cylindrical cavity. A clamp is positioned on the outside surface of the housing to apply an additional force on the housing.

24 Claims, 4 Drawing Sheets

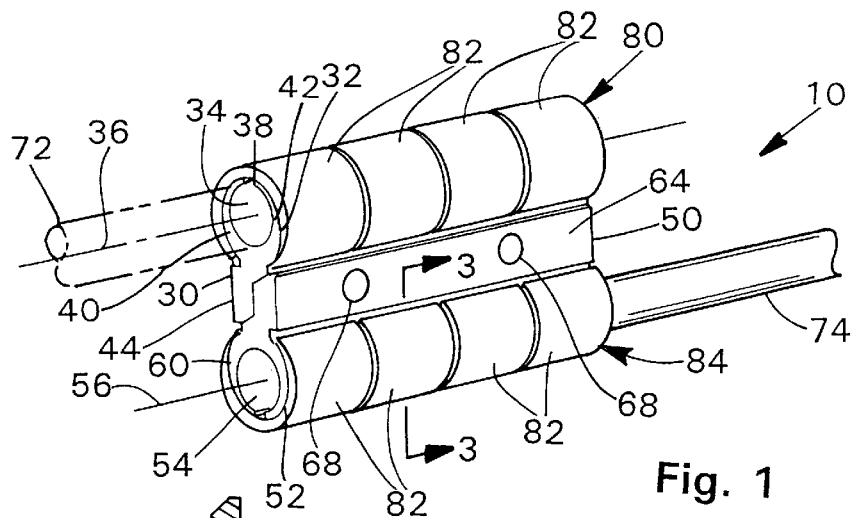
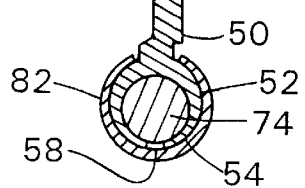
Fig. 3
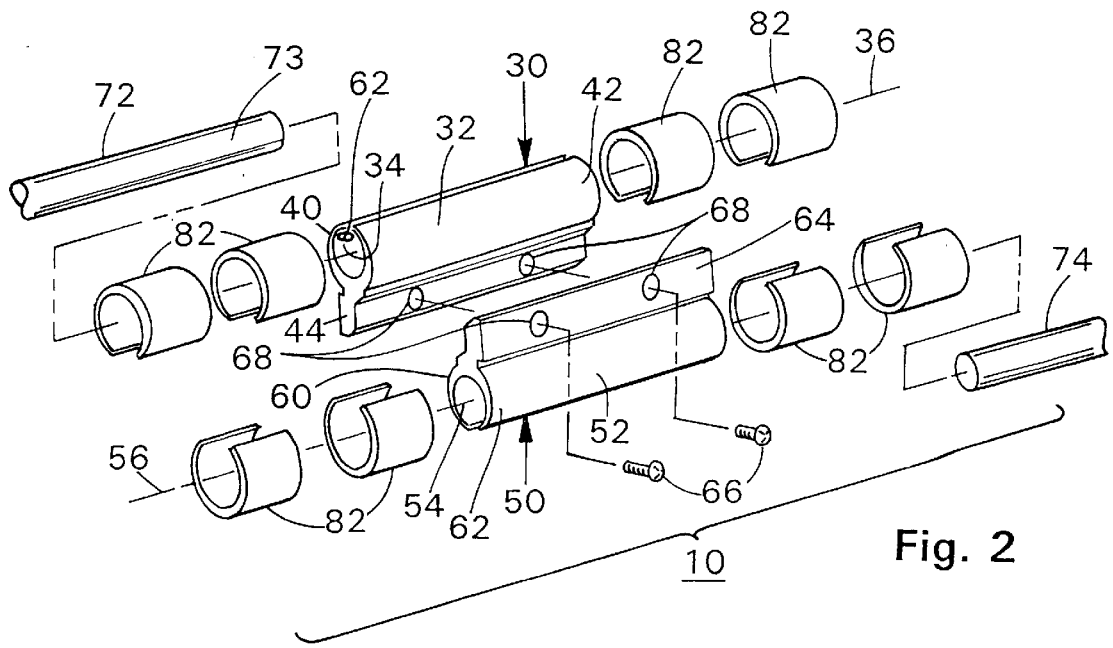
Fig. 2

ROTATABLE HEAT TRANSFER COUPLING

CROSS-REFERENCE TO RELATED APPLICATIONS

This application is a continuation of U.S. application Ser. No. 08/821,942, filed Mar. 21, 1997, U.S. Pat. No. 5,832,987.

BACKGROUND OF THE INVENTION

The present invention relates to a rotatable heat transfer coupling, and more particularly to a hinge for rotatably connecting a first object to a second object while providing for an efficient heat transfer path through the hinge.

The transfer of heat between a source and a sink is a known phenomenon. However, in order to obtain efficient heat transfer between objects, it is necessary to have a good heat conducting medium as well as to maximize the contact area between adjoining objects or heat conductors in order to provide for efficient transfer between the objects. While this is more easily accomplished for heat transfer between stationary objects, to date, no rotatable heat transfer couplings which have a good heat transfer efficiency are known.

It is especially important in the field of notebook computers to provide a means for transferring heat away from the processor and dissipating the heat. With the increased processor speeds and processing capacities, the amount of heat generated by the CPU has increased, generally requiring larger heat sinks attached to the CPU and fans for cooling the heat sinks. However, the energy drawn by the fan reduces the amount of computer usage time between battery recharging.

It would be desirable to provide an efficient heat transfer medium for transferring heat from a source, through a rotatable coupling, to a sink. In the field of notebook computers it would be especially advantageous to transfer heat from a CPU in the computer housing away from the processor to an area where it can be dissipated, preferably without the need for consuming power from the battery, such as by providing a higher capacity fan. It has been proposed to transfer the heat to the screen housing of the notebook computer where it can be dissipated more easily than in the lower base, since the screen housing is exposed on all sides during use as opposed to the lower base which usually rests on a flat surface. However, no efficient and reliable method has been previously known for transfer of heat from the processor housing in a notebook computer to the screen housing through a rotatable joint.

SUMMARY OF THE INVENTION

Briefly stated, the present invention provides a rotatable heat transfer coupling for rotatably connecting a first object to a second object for transfer of heat from the first object to the second object. The rotatable heat transfer coupling comprises a first heat transfer housing for attachment to one of the first and second objects. The housing has an outside surface and an inside surface defining a generally cylindrical cavity having a longitudinal axis. A slot is provided through the housing between the surface and the generally cylindrical cavity. A cylindrical heat transfer component which is connected to the other of the first and second objects is located within the generally cylindrical cavity. A clamp is positioned on the outside surface of the housing to apply uniform forces on the housing.

In another aspect, the present invention provides a rotatable heat transfer coupling for rotatably connecting a first object to a second object for transfer of heat from the first object to the second object. The rotatable heat transfer coupling comprises first and second heat transfer housings. Each housing has an outside surface, an inside surface defining a generally cylindrical cavity having a longitudinal axis and a slot. The slot is provided through the housing between the outside surface and the generally cylindrical cavity and delineates opposing wall portions. A first cylindrical heat transfer component for connection to one of the first and second objects is located within the generally cylindrical cavity in the first housing. A second heat transfer component for connection to the other of the first and second objects is located within the generally cylindrical cavity of the second housing. Clamps are positioned on the outside surfaces of the first and second housing to apply uniform forces on the wall portions of the first and second housings.

In another aspect, the present invention provides a laptop computer having a screen housing, a processor housing and a hinge pivotably connecting the screen housing to the processor housing. A heat source is located within the processor housing which generates heat. Heat transfer means are provided for connecting the heat source to a rotatable heat transfer coupling located between the processor housing and the screen housing for transferring heat to the screen housing for dissipation. The rotatable heat transfer coupling includes a first heat transfer housing connected to one of the heat transfer means in the processor housing and the screen housing. The heat transfer housing has an outside surface and an inside surface defining a generally cylindrical cavity having a longitudinal axis. A slot is provided through the heat transfer housing between the outside surface and the generally cylindrical cavity. A cylindrical heat transfer component for connection to the other of the screen housing and the heat transfer means in the processor housing is located within the generally cylindrical cavity for transferring heat to the screen housing for dissipation. A clamp is positioned on the outside surface of the heat transfer housing to apply uniform forces on the heat transfer housing.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. The drawings are for the purpose of illustrating the present invention which is not limited to the devices and instrumentalities shown.

In the drawings:

FIG. 1 is a perspective view of a rotatable heat transfer coupling in accordance with a first preferred embodiment of the present invention;

FIG. 2 is a disassembled perspective view of the rotatable heat transfer coupling shown in FIG. 1;

FIG. 3 is a cross-sectional view taken along lines 3—3 in FIG. 1;

DETAILED DESCRIPTION OF THE INVENTION

Figure 4:
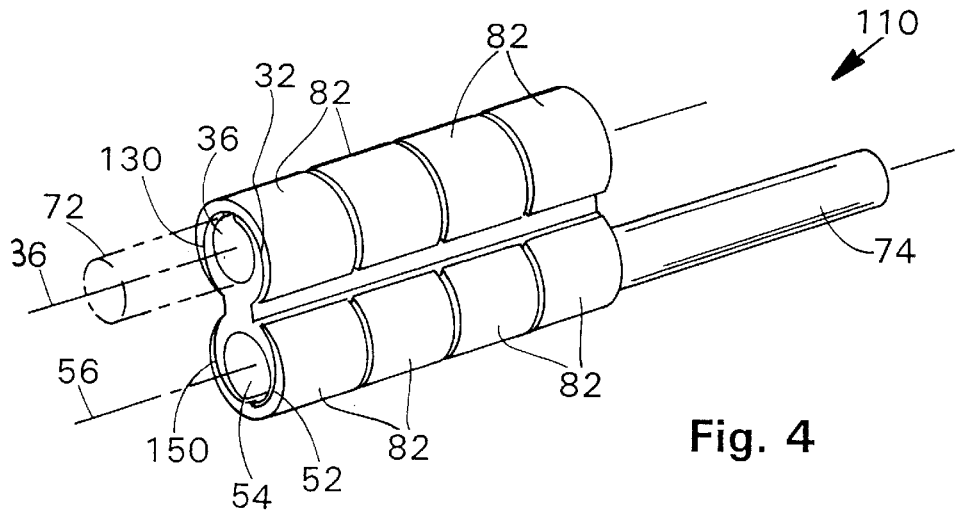
FIG. 4 is a perspective view of a second embodiment of a rotatable heat transfer coupling in accordance with the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the rotatable heat transfer coupling 10 and designated parts thereof. The terminology includes the words specifically mentioned above, derivatives thereof and words of similar import.

Figure 6:
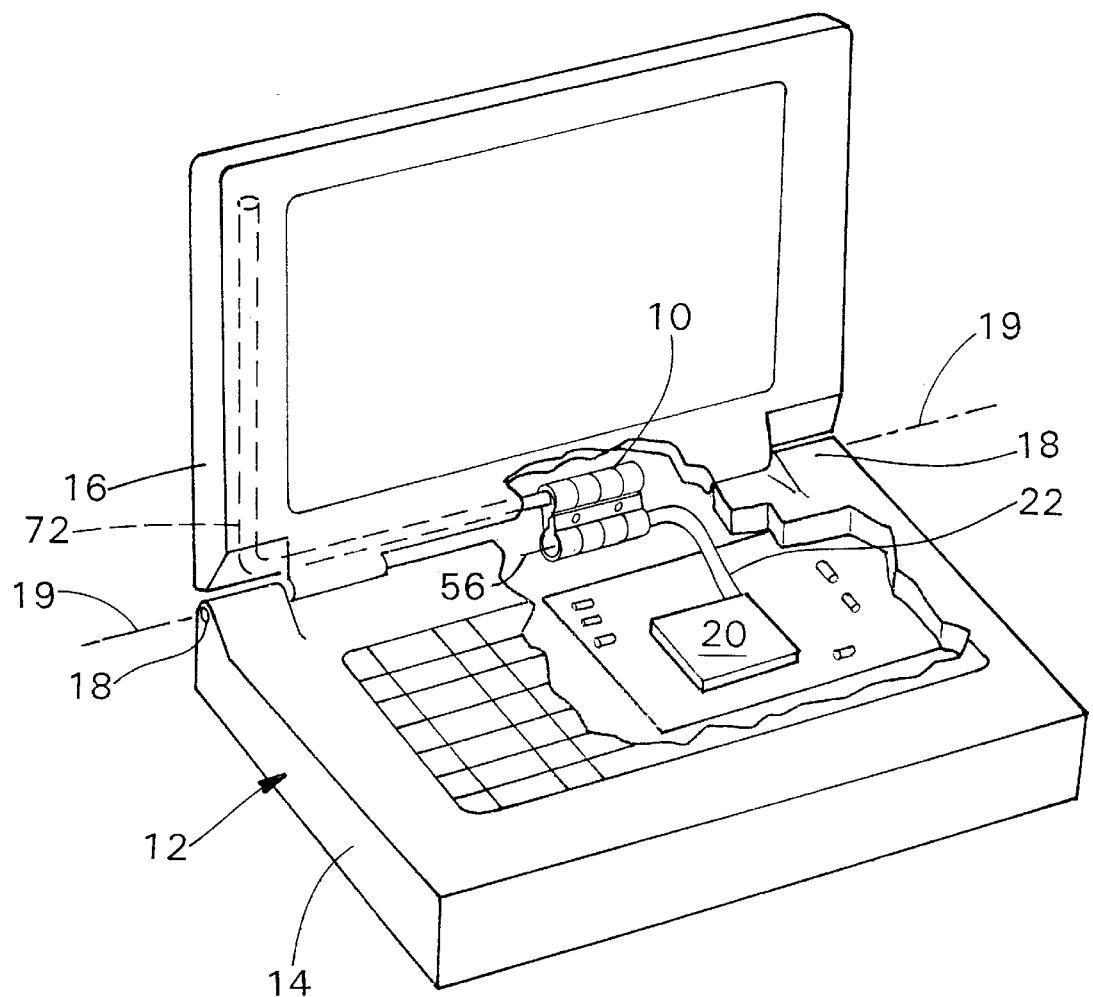
FIG. 6 is a perspective view showing a laptop computer having a rotatable heat transfer coupling in accordance with the present invention.

Referring to the drawings, wherein like numerals indicate like elements throughout, there is shown in FIGS. 1, 4 and 6 a first preferred embodiment of a rotatable heat transfer coupling 10 in accordance with the present invention. The heat transfer coupling 10 is used for rotatably connecting a first object, such as a processor housing 14 of a laptop computer 12 to a second object, such as the screen housing 16 of the laptop computer 12, as shown in FIG. 6. Preferably, at least one structural hinge 18, such as that disclosed in U.S. Pat. No. 5,491,874, which is incorporated herein by reference as if fully set forth, pivotably connects the screen housing 16 to the processor housing 14. However, the structural hinges may be eliminated in some applications where there is a minimal strength requirement on the juncture between the objects being joined. A heat source 20, which is preferably the heat sink for the CPU in the laptop computer 12, is located within the processor housing 14 and generates heat. Heat transfer means 22, such as a heat pipe are used to connect the heat source to the rotatable heat transfer coupling 10. However, depending on the application, the heat source could be attached directly to one side of the rotatable heat transfer coupling 10.

Referring to FIGS. 1–3, the rotatable heat transfer coupling 10 comprises a first heat transfer housing 30 for attachment to one of the first and second objects. The first heat transfer housing 30 has an outside surface 32 with a generally cylindrically shaped portion and an inside surface defining a generally cylindrical cavity 34 having a longitudinal axis 36. A slot 38 is provided through the housing 30 between the outside surface 32 and the generally cylindrical cavity 34. Preferably, the slot 38 defines opposing wall portions 40, 42 of the housing 30. The housing 30 is geometrically configured to have substantially uniform strength in a direction normal to the longitudinal axis 36.

In the preferred embodiment, the opposing wall portions 40, 42 of the housing 30 are geometrically configured with a varying wall thickness to provide the substantially uniform strength in the direction normal to the longitudinal axis 36. However, it will be recognized by those skilled in the art from the present disclosure that other suitable methods for geometrically configuring the housing to have uniform strength can be used, such as those disclosed in U.S. Pat. No. 5,491,874. Preferably a flange 44 is connected to the housing 30 in a position opposite to the slot 38.

Still referring to FIGS. 1–3, in the first preferred embodiment of the rotatable heat transfer coupling 10, the first heat transfer housing 30 is preferably connected to the one of the first and second objects via a second heat transfer housing 50 which is connected to the first heat transfer housing 30. The second housing 50 includes an outside surface 52 with a generally cylindrically shaped portion and an inside surface defining a second generally cylindrical cavity having a second longitudinal axis 56. A second slot 58 is provided through the second housing 50 between the outside surface 52 and the second generally cylindrically shaped cavity 54 which defines opposing wall portions 60, 62 of the second housing 50. The second housing 50 is also geometrically configured to have a substantially uniform strength in a direction normal to the second longitudinal axis 56. Preferably, both the first and second housings 30, 50 are geometrically configured with a varying wall thickness to have the substantially uniform strength in the direction normal to the respective longitudinal axes 36, 56. The second housing 50 preferably also includes a flange 64 which is connected to the flange 44 of the first heat transfer housing 30, as described in more detail below.

It will be recognized by the skilled artisan from the present disclosure that the first heat transfer housing 30 could be connected directly to the one of the first and second objects, and preferably to the processor housing 14 of the notebook computer 12, without the second housing 50 by directly connecting the flange 44 to the one of the first and second objects, preferably the processor housing 14, if desired.

As shown in FIGS. 1 and 2, the first and second housings 30, 50 are removably connected together, preferably with screws 66 which are installed through apertures 68 defined in the flanges 44, 64 of the first and second housings 30, 50. Preferably, the apertures 68 in one of the flanges 44, 64 are tapped, and the apertures in the other of the flanges 44, 64 are provided with a clearance hole for the screws 66 such that they can be installed through the clearance holes and be engaged in the tapped holes in the other flange 44, 64. However, clearance holes can be provided in both flanges 44, 64, if desired, and a two piece removable fastener installed, such as a threaded fastener and a nut.

In the first preferred embodiment a cylindrical heat transfer component 72 is provided for connection to the other of the first and second objects, preferably to the screen housing 16 of a laptop computer 12, as shown in FIG. 6. The first cylindrical heat transfer component 72 is located within the generally cylindrical cavity 34, preferably with an interference fit. As shown in FIG. 1, preferably a second cylindrical heat transfer component 74 is provided for connection to the heat source in the one of the first and second objects, preferably to the heat source 20 in the processor housing 14. The second cylindrical heat transfer component 74 is preferably located within the second generally cylindrical cavity 54 of the second heat transfer housing 50, preferably with an interference fit. However, it will be understood by those skilled in the art from the present disclosure that if the second housing 50 is not used, the second cylindrical heat transfer component 74 can be connected directly to the flange 44 of the first housing 30 or a modified attachment located on the housing 30, if desired. It will be similarly understood by the skilled artisan that an interference fit is not required between the first and second cylindrical heat transfer components 72, 74 and the respective generally cylindrical cavities 34, 54 in the housings 30, 50. The first rotatable cylindrical heat transfer component 72 can then be attached to or act as the heat sink, such that the heat sink can be pivoted relative to the heat source, with the cylindrical heat transfer component 72 rotating within the housing 30.

Preferably, the cylindrical heat transfer component 72 has an outside surface portion 73 which is located within the cylindrical cavity 34, and the inside surface of the housing 30 engages substantially the entire outside surface portion 73 of the cylindrical heat transfer component 72 located within the cylindrical cavity 34 with substantially uniform pressure for maximum contact with the available surface area for efficient heat transfer. This is accomplished due to the geometrical configuration of the housing 30 being of substantially uniform it strength in a direction normal to the longitudinal axis 36, as discussed in U.S. Pat. No. 5,491,874.

In the preferred embodiment, a lubricant 62, shown in FIG. 2, is located between the inside surface of the housing 30 and the cylindrical heat transfer component 72. The lubricant 62 preferably has good anti-friction characteristics as well as good thermal transfer properties. The lubricant 62 provides lubrication for the movement of the first cylindrical heat transfer component 72 relative to the housing 30. Since only one juncture needs to rotate, preferably the lubricant between the inside of the second cavity 54 and the second cylindrical heat transfer component 74 has good thermal properties, and need not have anti-friction characteristics. Preferably, the lubricant is petroleum-based material.

In the first preferred embodiment, the first and second cylindrical heat transfer components 72, 74 comprise heat pipes made from a material with a high thermal conductivity, such as copper or a copper alloy. One such heat pipe is generally available from Thermocore, Inc., Lancaster, Pa. or from Fujikura, Tokyo, Japan. However, it will be recognized by those skilled in the art from the present disclosure that any cylindrically shaped heat transfer element having good thermal transfer properties can be used in conjunction with the present invention.

Still with reference to FIGS. 1–3, a clamp 80 is positioned on the outside surface 32 of the generally cylindrically shaped portion of the housing 30 to apply an additional force on the housing 30. This is done to ensure a tight fit and maximum surface contact between the inside surface of the housing 30 and the outside surface 73 of the cylindrical heat transfer component 72. This provides for good thermal conductivity while still allowing the cylindrical heat transfer component 72 to rotate within the cavity 34 in the housing 30.

In the preferred embodiment, the clamp 80 comprises a plurality of spring clips 82, shown most clearly in FIG. 2. The spring clips are used to evenly distribute force on the outside surface 32 of the generally cylindrically shaped portion of the housing 30. Additionally, the spring clips 82 ensure good surface contact over time between the cylindrical heat transfer component 72 and the inside surface of the housing 30, even if some wear or lapping takes place at the contact area. However, it will be recognized from the present disclosure that other types of clamps can be used, such as a mechanically actuated clamp using a screw to force a pair of shaped jaws together (not shown).

As shown in FIGS. 2 and 3, the spring clips 82 are preferably geometrically configured to have substantially uniform strength and apply an additional uniform force on the housing 30 in a direction normal to the longitudinal axis 36. Preferably, the spring clips 82 are geometrically configured with a varying wall thickness to have the substantially uniform strength in the direction normal to the longitudinal axis 36. However, it will be recognized by those skilled in the art from the present disclosure that other suitable methods for geometrically configuring the spring clips 82 to have uniform strength can be used, such as those disclosed in U.S. Pat. No. 5,491,874. The spring clips 82 are C-shaped and are preferably positioned to cover the slot 38 in the housing 30.

Preferably, a second clamp 84 is positioned on the outside surface 52 of the second housing 50 to apply an additional force on the second housing 50. Preferably, the second clamp 84 also comprises the spring clips 82 which are geometrically configured to have substantially uniform strength and apply an additional uniform force on the second housing 50 in a direction normal to the second longitudinal axis 56. It will be recognized by the skilled artisan that the clamps 80 improve the thermal transfer efficiency of the coupling 10, however, they may be omitted if a lower thermal transfer efficiency is acceptable.

In the preferred embodiment, the spring clips 82 are made from a pfinodal material, such as AM388 which is available from Ametek, Wallingford, Conn. However, it will be recognized by those skilled in the art from the present disclosure that other materials, such as beryllium copper, spring steel, or any suitable spring copper alloy can be used, if desired.

In order to provide ease of maintenance and especially in notebook computers, it is preferable to provide first and second housings 30, 50, as shown and described above, such that the first and second housings 30, 50 can be easily detached from each other without disturbing the connection between the respective cylindrical heat transfer components 72, 74 and the housings 30, 50.

Referring again to FIGS. 2 and 6, preferably one longitudinal axis 36, 56 of one of the heat transfer housings 30, 50 is aligned with the axis 19 of the hinge 18 in order to assure smooth rotation of the cylindrical heat transfer components 72 with the movement of the hinge 18, without binding. In the illustrated embodiment, the axis 19 of the hinge 18 is aligned with the second longitudinal axis 56.

Figure 5:
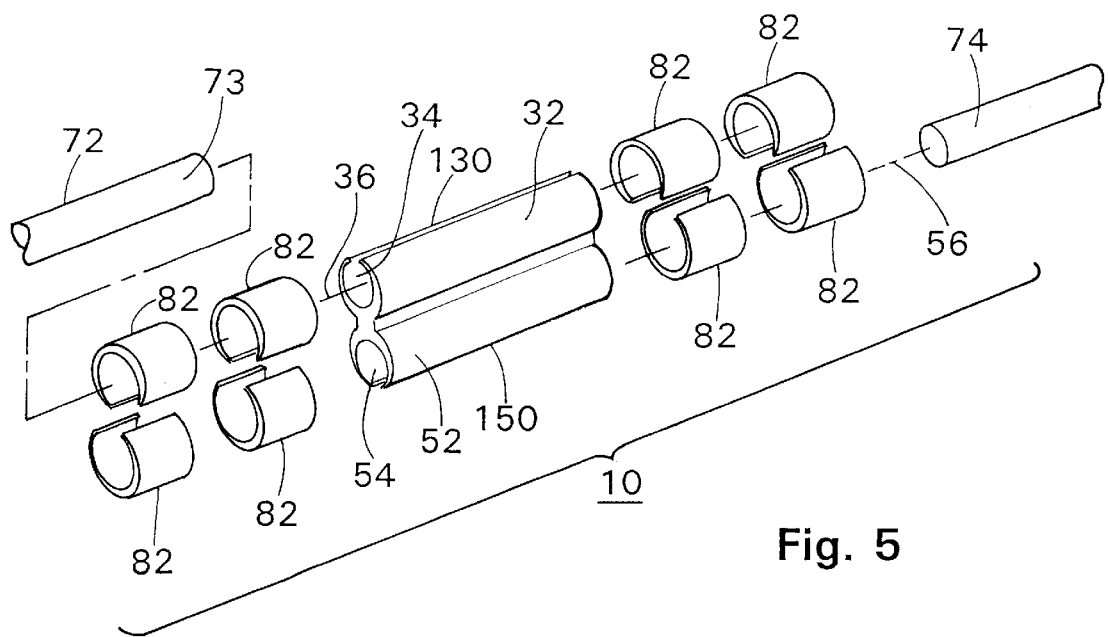
FIG. 5 is a disassembled perspective view of the rotatable heat transfer coupling shown in FIG. 4.

Referring now to FIGS. 4 and 5, a second preferred embodiment of the rotatable heat transfer coupling 110 is shown. The second preferred embodiment of the rotatable heat transfer coupling 110 is the same as the first embodiment 10 and like elements have been identified with the same reference numerals. The differences between the first and second embodiments 10, 110 of the rotatable heat transfer coupling are described in detail below.

In the second preferred embodiment of the invention, the first and second housings 130, 150 are integrally formed as a single piece, as shown in FIG. 5. The first and second cylindrical heat transfer components 72, 74 are located in the respective cavities 34, 54, and the spring clips 82 are installed on the generally cylindrical portions of the outside surface 32, 52 of the first and second integrally formed housings 130, 150 in a similar manner to the first embodiment.

Figure 7:
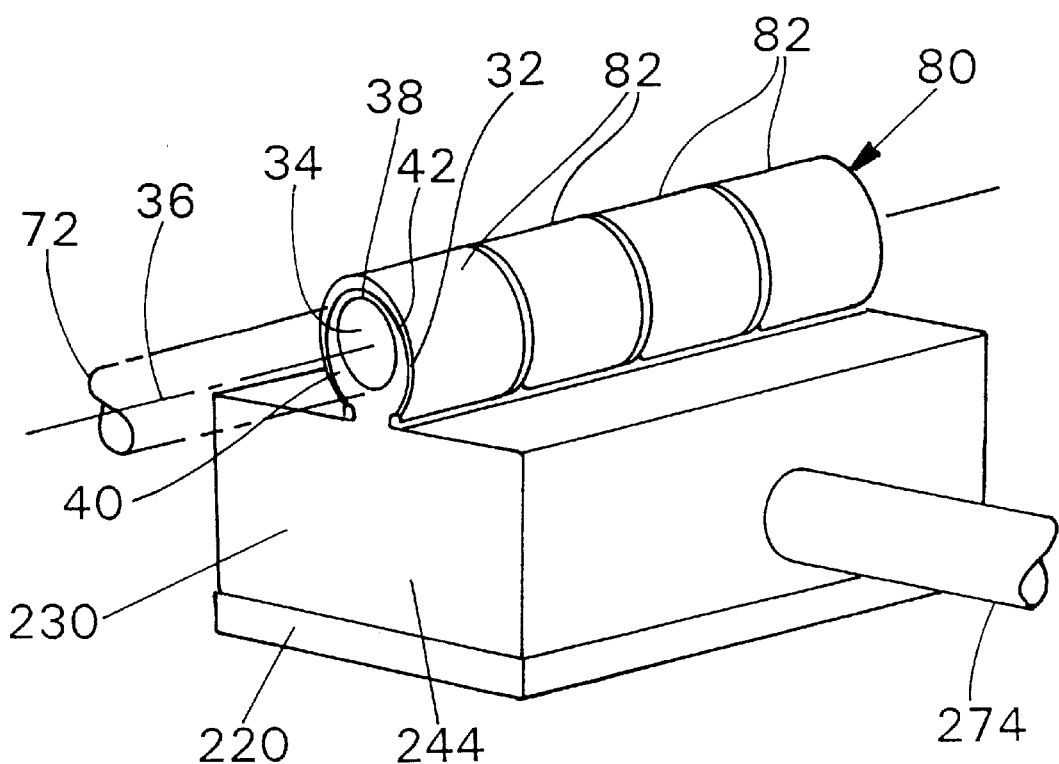
FIG. 7 is a perspective view of a third embodiment of a rotatable heat transfer coupling in accordance with the present invention.

Referring now to FIG. 7, a third embodiment of a rotatable heat transfer coupling 210 is shown. The third preferred embodiment of the rotatable heat transfer coupling 210 is similar to the first embodiment 10, and like elements have been identified with the same reference numeral. The differences between the first and third embodiments 10, 210 of the rotatable heat transfer coupling are described in detail below.

In the third preferred embodiment of the rotatable heat transfer coupling 210, only the first heat transfer housing 230 is provided. The flange 44 has been replaced with a heat sink/transfer block attachment 244 which can be attached directly to the heat source, such as CPU 220, or can be directly connected to a heat pipe 274, or can accommodate both, as shown. The rotatable coupling between the housing 230 and the first cylindrical heat transfer component 72 is identical to that described in connection with the first embodiment 10.

Preferably, the housings 30, 50, 130, 150, 230 are made either from pure copper or from a sintered copper material. However, it will be recognized by those skilled in the art from the present disclosure that any other material with a high thermal conductivity can be used. Preferably, the housings 30, 50 are cast to the basic shape and machined for a close tolerance fit. However, it will recognized by the skilled artisan that the housings 30, 50 can be formed by other means, such as precision casting and lapping or can be machined from solid stock, if desired.

The rotatable heat transfer couplings 10, 110, 210 of the present invention provide an efficient means for rotatably coupling first and second objects together with a high heat transfer efficiency. A rotatable heat transfer coupling 10 in accordance with the present invention was tested and transferred heat with only a 0.3–0.4° C./watt loss across the rotatable coupling due to losses in conduction at the part interfaces.

It will be appreciated by those skilled in the art that changes could be made to the embodiments described above without departing from the broad inventive concept thereof. While the rotatable heat transfer coupling 10, 110 has been disclosed for use in laptop computers, it can be used for any other application where heat transfer through a rotatable coupling is desired. It is understood, therefore, that this invention is not limited to the particular embodiments disclosed, but it is intended to cover modifications within the spirit and scope of the present invention as defined by the appended claims.

What is claimed is:

1. A rotatable heat transfer coupling for rotatably connecting a first object to a second object for transfer of heat from the first object to the second object, the rotatable heat transfer coupling comprising:

a first heat transfer housing for attachment to one of the first and second objects, the housing having an outside surface and an inside surface defining a generally cylindrical cavity having a longitudinal axis, a slot being provided through the housing between the outside surface and the generally cylindrical cavity;

a cylindrical heat transfer component for connection to the other of the first and second objects being located within the generally cylindrical cavity; and a clamp positioned on the outside surface of the housing to apply an additional force on the housing.

2. The rotatable heat transfer coupling of claim 1 wherein the slot defines opposing wall portions of the housing, and the opposing wall portions have a varying wall thickness.

3. The rotatable heat transfer coupling of claim 1 wherein the clamp comprises a plurality of spring clips.

4. The rotatable heat transfer coupling of claim 3 wherein the spring clips are C-shaped and are positioned to cover the slot.

5. The rotatable heat transfer coupling of claim 1 wherein the cylindrical heat transfer component has an outside surface portion which is located within the cylindrical cavity and the inside surface of the housing engages substantially the entire outside surface portion of the cylindrical heat transfer component located within the cylindrical cavity.

6. The rotatable heat transfer coupling of claim 1 wherein the cylindrical heat transfer component is located within the generally cylindrical cavity with an interference fit.

7. The rotatable heat transfer coupling of claim 1 further comprising a thermally conductive grease located between the inside surface of the housing and the cylindrical heat transfer component.

8. The rotatable heat transfer coupling of claim 1 wherein the outside surface of the first heat transfer housing has a generally cylindrically shaped portion and the clamp is positioned on the generally cylindrically shaped portion.

9. The rotatable heat transfer device of claim 1 further comprising a second heat transfer housing connected to the first heat transfer housing, the second housing having an outside surface and an inside surface defining a second generally cylindrical cavity having a second longitudinal axis, a second slot being provided through the second housing between the outside surface and the second generally cylindrical cavity;

a second cylindrical heat transfer component for connection to the one of the first and second objects being located within the second generally cylindrical cavity; and a clamp positioned on the outside surface of the second housing to apply an additional force on the second housing.

10. The rotatable heat transfer coupling of claim 9 wherein the first and second housings each have a varying wall thickness.

11. The rotatable heat transfer coupling of claim 10 wherein the clamps on the first and second housings comprise spring clips.

12. The rotatable heat transfer coupling of claim 9 wherein the first and second housings are removably connected together.

13. The rotatable heat transfer coupling of claim 9 wherein the first and second cylindrical heat transfer components comprise heat pipes.

14. The rotatable heat transfer coupling of claim 9 wherein the outside surface of the second heat transfer housing has a generally cylindrically shaped portion, and the clamp is positioned on the generally cylindrically shaped portion.

15. The rotatable heat transfer coupling of claim 9 wherein the second cylindrical heat transfer component is located within the second generally cylindrical cavity with an interference fit.

16. A rotatable heat transfer coupling for rotatably connecting a first object to a second object for transfer of heat from the first object to the second object, the rotatable heat transfer coupling comprising:

first and second heat transfer housings, each housing having an outside surface with a generally cylindrically shaped portion, an inside surface defining a generally cylindrical cavity having a longitudinal axis, and a slot being provided through the housing between the outside surface and the generally cylindrical cavity which delineates opposing wall portions;

a first cylindrical heat transfer component for connection to one of the first and second objects being located within the generally cylindrical cavity in the first housing;

a second cylindrical heat transfer component for connection to the other of the first and second objects being located within the generally cylindrical cavity in the second housing; and clamps positioned on the outside surfaces of the generally cylindrically shaped portions of the first and second housings to apply an additional force on the wall portions of the first and second housings.

17. The rotatable heat transfer coupling of claim 16 wherein the opposing wall portions of the first and second housings have a varying wall thickness.

18. The rotatable heat transfer coupling of claim 16 wherein the clamps comprise spring clips.

19. The rotatable heat transfer coupling of claim 16 wherein the first and second housings are removably connected together.

20. The rotatable heat transfer coupling of claim 16 wherein the first and second cylindrical heat transfer components comprise heat pipes.

21. A laptop computer comprising:

a screen housing;

a processor housing;

a hinge pivotally connecting the screen housing to the processor housing;

a heat source located within the processor housing which generates heat;

heat transfer means connecting the heat source to a rotatable heat transfer coupling located between the processor housing and the screen housing for transferring heat to the screen housing for dissipation, the rotatable heat transfer coupling including;

a first heat transfer housing connected to one of the heat transfer means in the processor housing and the screen housing, the heat transfer housing having an outside surface and an inside surface defining a generally cylindrical cavity having a longitudinal axis, a slot being provided through the heat transfer housing between the outside surface and the generally cylindrical cavity;

a cylindrical heat transfer component for connection to the other of the screen housing and the heat transfer means in the processor housing being located within the generally cylindrical cavity for transferring heat to the screen housing for dissipation; and a clamp positioned on the outside surface of the heat transfer housing to apply an additional force on the heat transfer housing.

22. The laptop computer of claim 21 wherein the outside surface of the heat transfer housing has a generally cylindrically shaped portion and the clamp is positioned on the generally cylindrically shaped portion.

23. The laptop computer of claim 21 wherein the slot defines opposing wall portions of the housing, and the opposing wall portions have a varying wall thickness.

24. The laptop computer of claim 21 wherein the clamp comprises a plurality of spring clips.

\* \* \* \* \*